US011380318B2

(12) United States Patent
Ishikawa et al.

(10) Patent No.: US 11,380,318 B2
(45) Date of Patent: Jul. 5, 2022

(54) EVALUATION SYSTEM, EVALUATION METHOD, AND PROGRAM

(71) Applicant: MITSUBISHI HEAVY INDUSTRIES, LTD., Tokyo (JP)

(72) Inventors: Yoshiki Ishikawa, Tokyo (JP); Yasuhiko Fukuyama, Tokyo (JP); Kohei Masuda, Tokyo (JP); Keiko Ishikawa, Tokyo (JP); Tomohiro Komine, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 294 days.

(21) Appl. No.: 16/623,926

(22) PCT Filed: Aug. 15, 2018

(86) PCT No.: PCT/JP2018/030344
§ 371 (c)(1),
(2) Date: Dec. 18, 2019

(87) PCT Pub. No.: WO2019/035465
PCT Pub. Date: Feb. 21, 2019

(65) Prior Publication Data
US 2020/0135195 A1 Apr. 30, 2020

(30) Foreign Application Priority Data

Aug. 18, 2017 (JP) .............................. JP2017-158021

(51) Int. Cl.
*G10L 15/22* (2006.01)
*G06F 16/64* (2019.01)
(Continued)

(52) U.S. Cl.
CPC .............. *G10L 15/22* (2013.01); *G06F 16/64* (2019.01); *G06Q 10/06393* (2013.01);
(Continued)

(58) Field of Classification Search
None
See application file for complete search history.

(56) References Cited

U.S. PATENT DOCUMENTS

| 7,706,906 B2 * | 4/2010 | Ara ............... G06Q 10/063114 700/111 |
| 7,877,686 B2 * | 1/2011 | Abbott ............ G06Q 10/109 715/708 |

(Continued)

FOREIGN PATENT DOCUMENTS

| JP | H09-069008 A | 3/1997 |
| JP | H11-328243 A | 11/1999 |

(Continued)

OTHER PUBLICATIONS

International Search Report dated Nov. 6, 2018, issued in counterpart Application No. PCT/JP2018/030344, with English translation. (3 pages).

(Continued)

*Primary Examiner* — Nafiz E Hoque
(74) *Attorney, Agent, or Firm* — WHDA, LLP

(57) ABSTRACT

An evaluation system includes a speech data acquisition unit configured to acquire speech data from speech of a member engaged in a task, a speech recognition unit configured to recognize content of the speech from the speech data and convert the content into text data, a task data acquisition unit configured to acquire data indicating an action related to the task of the member and data indicating a task status, an extraction unit configured to extract conversation data related to the task from the text data based on the content of the speech recognized by the speech recognition unit, and an analysis unit configured to analyze correlations between the conversation data, the data indicating the action, and the data indicating the task status.

16 Claims, 7 Drawing Sheets

(51) Int. Cl.
  *G06Q 10/06*  (2012.01)
  *G06Q 50/04*  (2012.01)
  *G10L 15/08*  (2006.01)

(52) U.S. Cl.
  CPC ..... *G06Q 10/063114* (2013.01); *G06Q 50/04* (2013.01); *G10L 15/08* (2013.01); *G10L 2015/088* (2013.01); *G10L 2015/223* (2013.01)

(56) References Cited

U.S. PATENT DOCUMENTS

| | | | | |
|---|---|---|---|---|
| 9,170,993 | B2* | 10/2015 | Kalia | G06F 40/40 |
| 9,699,312 | B2* | 7/2017 | Kuhn | H04M 3/42221 |
| 9,904,669 | B2* | 2/2018 | Gunaratna | G06F 40/284 |
| 10,909,490 | B2* | 2/2021 | Raj | G06Q 10/06398 |

FOREIGN PATENT DOCUMENTS

| | | | |
|---|---|---|---|
| JP | 4911939 | B2 | 4/2012 |
| JP | 5349194 | B2 | 11/2013 |

OTHER PUBLICATIONS

Written Opinion dated Nov. 6, 2018, issued in counterpart Application No. PCT/JP2018/030344, with English translation. (7 pages).

\* cited by examiner

FIG. 2

| TIME | SPEAKER | CONTENT |
|---|---|---|
| 13:10:10 | OPERATOR A | PRESSURIZER WATER LEVEL LOW ALARM ISSUED. |
| ... | ... | ... |
| 13:10:30 | DUTY MANAGER | MR/MS. A, PLEASE ADDITIONALLY START B FILLING PUMP. |
| 13:10:31 | OPERATOR A | THIS IS THE SECOND B FILLING PUMP. |
| 13:10:32 | DUTY MANAGER | YES, THAT'S RIGHT. |
| 13:10:40 | OPERATOR A | START B FILLING PUMP. |
| ... | ... | ... |

| TIME | OPERATION SYMMETRY | OPERATION CONTENT |
|---|---|---|
| 13:10:40 | B FILLING PUMP | START |
| ... | ... | ... |

(b)

| TIME | MONITORING TARGET | MEASUREMENT VALUE | DETERMINATION | ACTION |
|---|---|---|---|---|
| 13:10:09 | WATER LEVEL OF PRESSURIZER | L1 | ABNORMAL (LOW) | ALERT ALARM |
| ... | ... | ... | ... | |
| 13:10:40 | WATER LEVEL OF PRESSURIZER | L2 | ABNORMAL (LOW) | |
| ... | ... | ... | ... | |
| 13:13:40 | WATER LEVEL OF PRESSURIZER | L3 | NORMAL | |
| ... | ... | ... | ... | |

EVALUATION SYSTEM, EVALUATION METHOD, AND PROGRAM

TECHNICAL FIELD

The present invention relates to an evaluation system, an evaluation method, and a program.

Priority is claimed on Japanese Patent Application No. 2017-158021, filed Aug. 18, 2017, the content of which is incorporated herein by reference.

BACKGROUND ART

Operations in power plants are performed by communication through conversations between members (including duty managers, assistant managers, operators, etc.) within an operation team which performs monitoring and operation procedures in a control room and members (managers, field members, etc.) outside the control room. In such a task for which cooperation of a plurality of members is required, it is important to transmit information before and after actions. For example, in the case of plant operations, the actions of a team performing operations tends to be evaluated, and not only for individuals performing appropriate operations to operate the plant correctly, but also for personnel for a role to be instructed appropriately, a behavioral pattern is required in which personnel in a role receiving instructions perform operations while responding appropriately.

Here, as a related technique, Patent Literature 1 describes a plant operational training simulator having a function of making audio and video recordings of the operations of a trainee during operational training in order to allow the conversations and operations during operational training to be checked later.

CITATION LIST

Patent Literature

[Patent Literature 1]
Japanese Unexamined Patent Application, First Publication No. H9-69008

SUMMARY OF INVENTION

Technical Problem

As described above, although in plant operation, transmission of information during operations is important, until now there has been no available technology for evaluating operational skills including conversations and operations, and information transmission through conversations during plant operation. For example, in Patent Literature 1, recording of speech and videos is described, but evaluation of the recorded speech data and video data in association with operation procedures is not described.

The present invention provides an evaluation system, an evaluation method, and a program through which the above problems can be addressed.

Solution to Problem

According to one aspect of the present invention, an evaluation system includes a speech data acquisition unit configured to acquire speech data from speech of a member engaged in a task, a speech recognition unit configured to recognize a content of the speech from the speech data and convert the content into text data, a task data acquisition unit configured to acquire data indicating an action related to the task of the member and data indicating a task status, an extraction unit configured to extract conversation data related to the task from the text data based on the content of the speech recognized by the speech recognition unit, and an analysis unit configured to analyze correlations between the conversation data extracted by the extraction unit, the data indicating the action, and the data indicating the task status.

According to one aspect of the present invention, the analysis unit evaluates correlations between the analyzed conversation data, the data indicating the action, and the data indicating the task status based on data indicating a strong correlation between the conversation, the action, and the task status.

According to one aspect of the present invention, the evaluation system further includes an evaluation result output unit configured to output information indicating a relationship between times at which conversations related to a task have been performed and results of the task for the evaluation result from the analysis unit.

According to one aspect of the present invention, the analysis unit analyzes temporal relationships between times at which conversations related to a task have been performed and times at which actions have been performed and relationships between times at which conversations related to the task have been performed and results of the task.

According to one aspect of the present invention, the analysis unit analyzes whether content of the conversation data and the action have the right relationship.

According to one aspect of the present invention, the extraction unit determines whether a predetermined type of conversation is established for the conversation data.

According to one aspect of the present invention, the evaluation system further includes a text data output unit configured to output content of the speech recognized by the speech recognition unit together with identification information of the member who made the speech and information about a time at which the speech was performed.

According to one aspect of the present invention, the evaluation system is a system for evaluating plant operation skills, the speech data acquisition unit acquires speech data of conversations that have been performed during operations by a plurality of members who have performed operations in the plant, the task data acquisition unit acquires information about operations performed by the members during operation of the plant and information indicating a plant status during the operation, and the analysis unit analyzes correlations between the conversations and the operations related to an event which was handled in the operation of the plant and the plant status.

According to one aspect of the present invention, an evaluation method includes a step of acquiring speech data from speech of a member engaged in a task, a step of recognizing content of the speech from the speech data and converting the content into text data, a step of acquiring data indicating an action related to the task of the member and data indicating a task status, a step of extracting conversation data related to the task from the text data based on the recognized content of the speech, and a step of analyzing correlations between the extracted conversation data, the data indicating the action, and the data indicating the task status.

According to one aspect of the present invention, a program causes a computer of an evaluation system to perform: a function of acquiring speech data from speech of a member engaged in a task; a function of recognizing content of the speech from the speech data and converting the content into text data; a function of acquiring data indicating an action related to the task of the member and data indicating a task status; a function of extracting conversation data related to the task from the text data based on the recognized content of the speech; and a function of analyzing correlations between the extracted conversation data, the data indicating the action, and the data indicating the task status.

Advantageous Effects of Invention

According to the evaluation system, evaluation method, and program described above, it is possible to clarify the relationship between the operation and conversation of the operator in the plant and evaluate whether an appropriate conversation has been performed.

BRIEF DESCRIPTION OF DRAWINGS

FIG. 2 is a diagram showing an example of text data in which a conversation is visualized in one embodiment of the present invention.

FIG. 3 is a diagram showing an example of operation/plant data in one embodiment of the present invention.

DESCRIPTION OF EMBODIMENTS

Embodiment

An operational training system according to an embodiment of the present invention will be described below with reference to FIG. 1 to FIG. 7.

Figure 1:
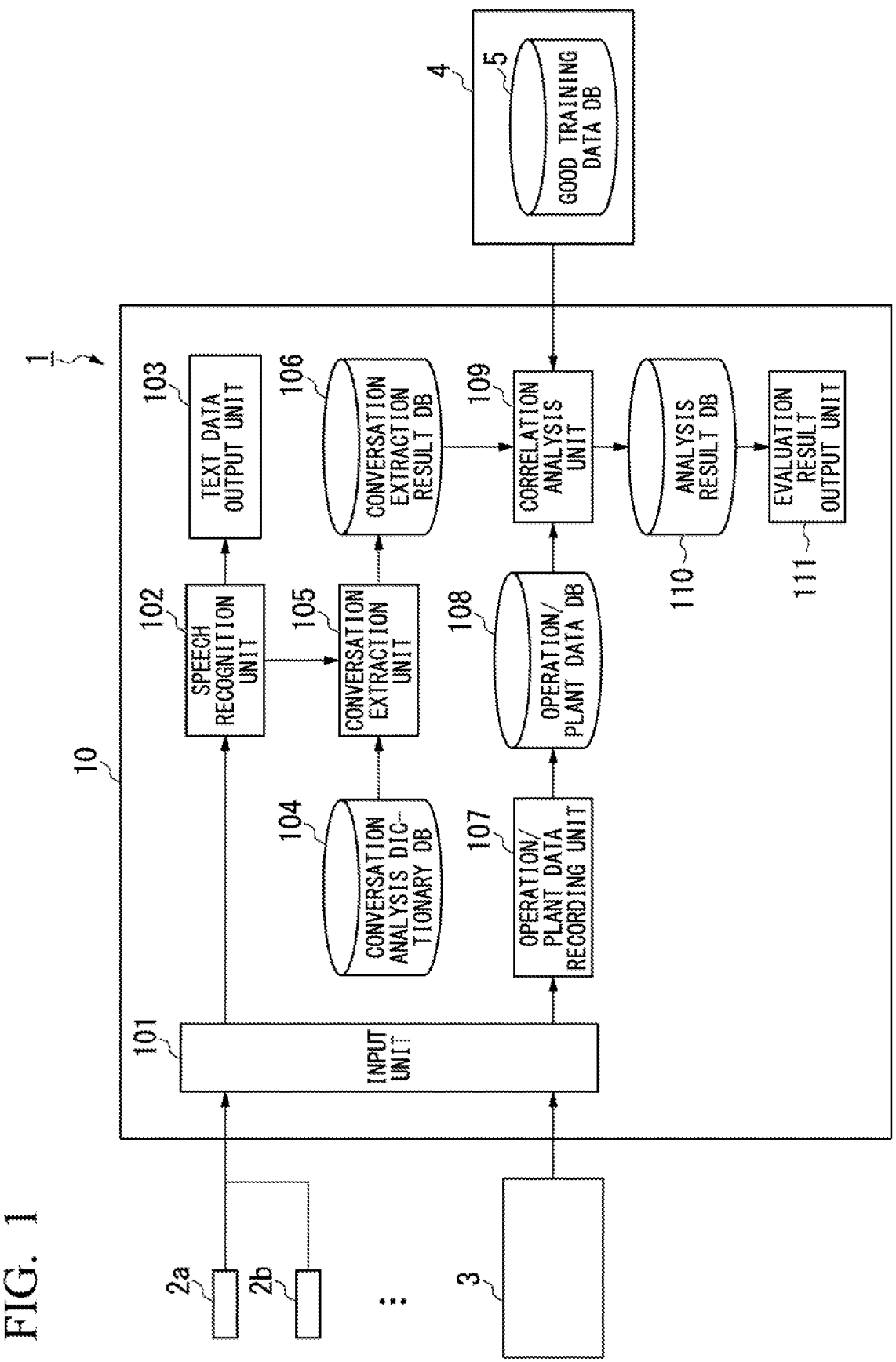
FIG. 1 is a functional block diagram showing a configuration example of an operational training system in one embodiment of the present invention.

FIG. 1 is a functional block diagram showing a configuration example of an operational training system in one embodiment of the present invention.

An operational training system 1 shown in FIG. 1 is a system for an operator such as a nuclear power plant to perform operational training. When the operational training system 1 of the present embodiment is used, conversations exchanged in an operational training control room of a plant and conversations outside the control room are recorded as time-series data together with data such as plant parameters, operations, and alarms, and it is possible to check whether information transmission through a conversation has been appropriately performed. In addition, when a conversation exchanged in advance in preparation for training operations (water source switching, device isolation, etc.) is extracted and analyzed, it is possible to visualize a conversation performance time and conversation content during training. The operational training system 1 has a function of simulating the state of a plant which is a subject for training, a function of recording content of an operation performed by an operator according to the plant status, and a function of evaluating an operation procedure performed by an operator. The operational training system 1 includes the microphones 2a and 2b, a simulator device 3, an operation evaluation result management device 4, and an operation evaluation system 10.

The microphones 2a and 2b collect sound spoken during operational training. For example, a duty manager (a member who is in charge of instructing) wears the microphone 2a during operational training and gives a sound instruction to perform an operation according to the conditions of the plant. On the other hand, an operator (a member who is in charge of performing an operation under the duty manager) wears the microphone 2b and performs speech of repetition of an instruction from the duty manager and the like. In this manner, in the operational training using the operational training system 1, the duty manager and the operator, or operators communicate with each other through conversations, and perform an operation while checking whether information has been transmitted accurately. The microphone 2a collects sound spoken by the duty manager and the microphone 2b collects sound spoken by the operator. Here, the number of microphones is not limited to 2, and microphones are provided according to the number of people participating in the training.

The simulator device 3 simulates the plant status according to a predetermined training scenario and records an operation performed by the operator and the time at which the operation is performed accordingly. In addition, the simulator device 3 calculates a change in the plant status over time during operational training and records the result. Hereinafter, data in which the operation performed by the operator and the time at which the operation is performed are recorded will be described as operation data, and data in which the plant status at respective times during operational training is recorded (various physical quantities such as a temperature, various control values such as a degree of valve opening and a rotational speed of a pump, and notification information such as alarm) will be described as plant data.

Operation data, plant data, and speech data during training which have been recorded during operational training performed in the past are recorded together with an evaluation thereof in the operational evaluation results management device 4. In particular, in a good training data DB (database) 5, operation data, plant data, and speech data recorded when exemplary good training is performed are stored for each event that occurs in the plant.

The operation evaluation system 10 acquires speech data collected by the microphone 2a and the like during operational training and operation data and plant data recorded in the simulator device 3 and evaluates the skills of the duty manager, the operator, and the like who participated in the operational training. The operation evaluation system 10 evaluates the operator's skill according to not only whether he or she performs an appropriate operation which leads to a desired plant state but also whether he or she appropriately speaks a predetermined conversation required before and after the operation. According to such evaluation, it is possible to review the following after operational training ends between operators including a duty manager (hereinafter, when someone is described as an operator, a duty manager and an assistant manager are included unless otherwise specified): (1) material to be communicated, (2) appropriate times, (3) a partner to whom the material should be communicated, (4) whether content to be delivered was spoken, (5) whether content is delivered to a partner, and (6) whether it is possible to operate the plant in a required state as a result of delivery, and it is possible to share an improvement plan that can be ascertained from the evaluation result with other operators.

The illustrated operation evaluation system 10 includes an input unit 101, a speech recognition unit 102, a text data output unit 103, a conversation analysis dictionary DB 104, a conversation extraction unit 105, a conversation extraction result DB 106, an operation/plant data recording unit 107, an operation/plant data DB 108, a correlation analysis unit 109, an analysis result DB 110, and an evaluation result output unit 111.

The input unit 101 acquires speech data that is collected by the microphones 2a and 2b and converted into an electrical signal, and outputs the speech data to the speech recognition unit 102 for each input port to which the microphones 2a and 2b are connected. In addition, the input unit 101 acquires operation data and plant data from the simulator device 3 and outputs this data to the operation/plant data recording unit 107.

The speech recognition unit 102 has a speech recognition function of recognizing content of speech data acquired from the input unit 101 and converting it into text data. A general speech recognition engine can be used for the speech recognition function. In addition, the speech recognition unit 102 has a function of associating each speech included in the converted text data with a time at which the speech was performed and speaker identification information. Specifically, for example, the speech recognition unit 102 associates a time at which the input unit 101 acquired speech data with text data as a speech time. In addition, for example, the speech recognition unit 102 associates speaker identification information with text data based on speaker identification information determined for each input port such as an input port of the microphone 2a and the duty manager, and an input port of the microphone 2b and the operator, and information about an input port from which the input unit 101 acquired speech data. The speech recognition unit 102 outputs text data in which a speech time is associated with speaker identification information to the text data output unit 103 and the conversation extraction unit 105.

If only speech in a control room is recorded, a conversation may be drowned out by, for example, an alarm sound, and thus content of the conversation may not be able to be ascertained even if the recorded speech data is regenerated later. On the other hand, in the present embodiment, since speech data collected by attaching the microphone 2a or the like to respective members is converted into text data, a speech recognition rate can be improved and the exchange of speech can be recorded accurately.

The text data output unit 103 outputs the text data acquired from the speech recognition unit 102 to a display device connected to the operation evaluation system 10 and the like. Here, text data output from the text data output unit 103 is exemplified in FIG. 2. FIG. 2 is a diagram showing an example of text data in which a conversation is visualized in one embodiment of the present invention. FIG. 2 shows a conversation performed between an operator A and a duty manager. As shown in FIG. 2, text data includes a time, a speaker, and speech content. According to text data output from the text data output unit 103, a conversation exchanged between the operator A and the duty manager can be visualized, and exchange of a speech content sequence can be visually recognized as text. Therefore, it is possible to check whether the type of conversation (3-way communication, etc.) is appropriate, whether a member who needs to issue an instruction has transmitted appropriate content regarding a material to be communicated to a partner to whom the material should be communicated, whether content to be delivered to a partner has been transmitted, and the like. Examples of types of conversation include 3-way communication and 2-way communication. In addition, with reference to time information, it is possible to check whether an instruction has been issued at an appropriate time and whether a conversation has been performed at an appropriate tempo.

Here, although not shown, for example, the speech recognition unit 102 may analyze and output the volume of voice based on the magnitude of the amplitude of speech data, and thus check whether a conversation is performed with an appropriate volume of voice. In addition, the speech recognition unit 102 can analyze a speaking speed, the tone of voice, a manner of speaking, and the like and perform outputting and thus can check objectively whether a speech that is easy for a listener to understand is produced with a calm voice.

In the conversation analysis dictionary DB 104, for example, in a 3-way communication example, a word exchange pattern (hereinafter referred to as a conversation pattern) in a conversation such as "Mr/Ms. X1, please cause X2 to X3" (transmit), "cause X2 to X3" (repeat), and "please" (check) is registered. Alternatively, a 2-way communication conversation pattern such as "Mr/Ms. X1, please cause X2 to X3" "(transmit), and "cause X2 to X3" (repeat) is registered. In addition, in the conversation analysis dictionary DB 104, a series of exchange patterns in which speech content indicating the occurrence of an event such as "XXX is detected" and "~alarm issued" is added before 2-way communication and 3-way communication is added may be registered.

In addition, in the conversation analysis dictionary DB 104, for example, keywords indicating a plant monitoring target subject (pressurizer) during operational training and events (a low water level and a high pressure) related to such a subject, an operation target subject (pump, valve) and an operation method (start and stop, open/close), and an operation amount (a degree of valve opening, etc.) are registered.

The conversation extraction unit 105 analyzes text data output from the speech recognition unit 102 with reference to the conversation analysis dictionary DB 104 and checks whether a predetermined type of conversation is established between a speaker and a listener. For example, the conversation extraction unit 105 determines whether a word exchange between operators matches a conversation pattern registered in the conversation analysis dictionary DB 104, and when they match, it is determined that a predetermined type of conversation has been established between operators. When a word exchange is somewhat similar to the conversation pattern even if it does not completely match the conversation pattern, the conversation extraction unit 105 may determine that a predetermined type of conversation has been established at that point. When it is determined that a conversation is established, the conversation extraction unit 105 extracts data at that point at which it is determined that a conversation is established from text data. In addition, for example, the conversation extraction unit 105 determines whether a conversation is established according to whether instruction content corresponds to repetition content. For example, in response to an instruction "please start the pump," when an operator repeats "it is a valve" and repeats "stop the pump," even if it follows a format of types of "transmit," "repeat," and "check." the conversation extraction unit 105 determines that a predetermined type of conversation has not been established. For example, conversation data from "13:10:10" to "13:10:40" exemplified in FIG. 2 is conversation data extracted by the conversation extraction unit 105.

In addition, regarding the extracted conversation data, the conversation extraction unit 105 compares words included in the conversation with keywords registered in the conversation analysis dictionary DB 104, and recognizes an event that has occurred in the plant to which the conversation is related. For example, in the example in FIG. 2, the conversation extraction unit 105 determines that the text data exemplified in FIG. 2 is conversation data, and additionally, recognizes that the conversation is a conversation related to an event indicating that the water level of the pressurizer is low according to conversation content at the start time of conversation data and a monitoring target subject "pressurizer" registered in the conversation analysis dictionary DB 104 and a word "low water level" indicating an event related thereto. Regarding the extracted conversation data, the conversation extraction unit 105 extracts words registered in the conversation analysis dictionary DB 104. For example, in the example in FIG. 2, the conversation extraction unit 105 extracts "B filling pump," "add," and "start" as specific words related to operational training for the event. The conversation extraction unit 105 extracts "pressurizer," "water level," and "low" which appear before "please additionally start B filling pump" as preceding and following words. The conversation extraction unit 105 records the extracted word "B filling pump" and the like, a time "13:10:10" at which the event started according to a conversation, a time "13:10:30" at which an instruction for the event started, the number of times of speaking of "5," other words before and after "start" and "pressurizer" and "water level," and the recognized event "the water level of the pressurizer decreased" in association with a determination of whether a predetermined type of conversation is established and its degree of establishment (for example, a similarity between the structure of the style of sentence specified in the conversation pattern and its order of appearance, and the structure of the style included in conversation data and its order of appearance) in the conversation extraction result DB 106.

In the conversation extraction result DB 106, conversation data extracted by the conversation extraction unit 105 and the degree of establishment of conversation, specific words extracted from the conversation, a time at which the event started according to a conversation, the number of times of speaking, other words before and after, and data such as an event are stored.

The operation/plant data recording unit 107 records operation data and plant data acquired from the input unit 101 in the operation/plant data DB 108.

In the operation/plant data DB 108, operation data and plant data are stored. Here, operation data and plant data will be exemplified. FIG. 3 is a diagram showing an example of operation/plant data in one embodiment of the present invention. FIG. 3(a) shows an example of operation data, and FIG. 3(b) shows an example of plant data. The data in FIG. 3(a) and FIG. 3(b) is recorded during training related to conversation data in FIG. 2. In the operation data in FIG. 3(a), it is recorded that an operation of "starting" "B filling pump" is performed at "13:10:40."

In the plant data in FIG. 3(b), time-series water level measurement values of the pressurizer and determination results corresponding to the measurement values are recorded. According to the example in FIG. 3(b), the water level measured at a time of "13:10:09" is "L1" and its determination result is "low." The water level measured at a time "13:10:40" at which the B filling pump started is "L2" and its determination result is "low." The water level measured at a time "13:13:40" when 3 minutes have elapsed after the B filling pump started is "L3" and it can be understood that the water level is restored to "normal."

The correlation analysis unit 109 analyzes correlations between conversation data, plant data, and operation data. For example, regarding a certain conversation a, a time period in which the conversation was performed (for example, several minutes before and after the conversation a may be included) is set as a time period α1, and the correlation analysis unit 109 extracts time-series values of parameters (a water level, a temperature, a pressure, etc.) related to the event indicated by the conversation data α in the time period α1 and information about notifications (alarms, etc.) issued by devices constituting the plant from the plant data. The types of parameters to be extracted are predetermined for each event. In addition, the correlation analysis unit 109 extracts information about an operation performed in the time period α1 included in the operation data. Then, regarding the conversation data α, the correlation analysis unit 109 arranges a time, speaker, and speech content of each speech included in the conversation data α and information extracted from the plant data and operation data on the same time axis, and analyzes the temporal relationships between the speech, operation, and parameter change. In addition, the correlation analysis unit 109 analyzes whether the instruction content included in the conversation data α and the operation indicated by the operation data have the right relationship. The correlation analysis unit 109 records the conversation data, operation data, and plant data related to the conversation a in association in the analysis result DB 110.

Figure 4:
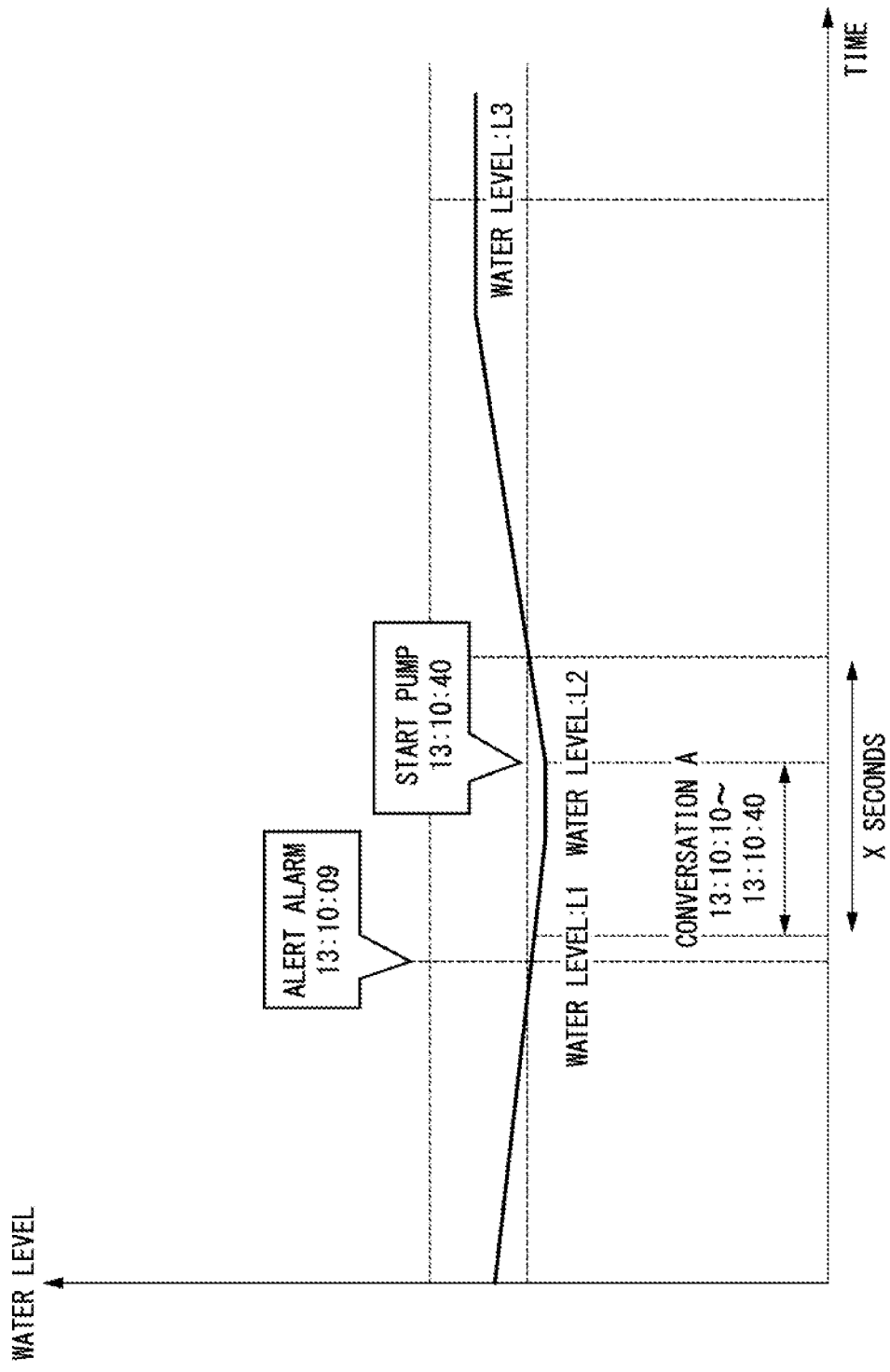
FIG. 4 is a diagram for explaining analysis of correlations in one embodiment of the present invention.

An example of analysis results obtained by the correlation analysis unit 109 will be described with reference to FIG. 4. FIG. 4 is a diagram for explaining analysis of correlations in one embodiment of the present invention.

FIG. 4 shows an example in which the conversation data, operation data, and plant data exemplified in FIG. 2 and FIG. 3 are arranged on the same time axis. In the example in FIG. 4, exchange in the conversation data is not displayed. These data are associated and recorded in the analysis result DB 110.

The correlation analysis unit 109 calculates, for example, a difference between an event occurrence time and a conversation start time (conversation starts 5 seconds after a low water level occurs), a difference between a conversation start time and a time at which an operation is performed (the pump starts 30 seconds after the conversation starts), and a difference between a conversation start time and a water level restoration time of the event (the water level is restored X seconds after the conversation starts). The correlation analysis unit 109 analyzes, for example, a relationship between a time relationship of an event occurrence time, a conversation start time, and a time at which an operation is performed and event results. For example, in the example in FIG. 4, the correlation analysis unit 109 analyzes that a time from when an event occurs until a conversation starts is 1 second, a time from when a conversation starts until an operation is performed is 30 seconds, a time from when an event occurs until an operation is performed is 35 seconds, and the event result has a relationship with "the water level restored" and records the analysis result in association with an event of "the water level of the pressurizer decreased" in the analysis result DB 110.

The correlation analysis unit 109 analyzes that instruction content of "please additionally start B filling pump" included in the conversation data exemplified in FIG. 2 and an operation indicating "start B filling pump" indicated by the operation data exemplified in FIG. 3(a) have the right relationship (the instruction content and the operation match) and records the analysis results in the analysis result DB 110.

After the correlation between conversation data, operation data, and plant data is analyzed, the correlation analysis unit 109 sets improvement plan information indicating analysis result evaluations and improvement plans based on correlations between conversation data, operation data, and plant data during good training stored in the good training data DB 5. In the good training data DB 5, conversation data, operation data, and plant data when an exemplary conversation and operation are performed for each event are recorded. In the good training data DB 5, for example, in association with an event of "the water level of the pressurizer decreased," a time from when an event occurs until a conversation starts of 1 second, a time from when a conversation starts until an operation is performed of 20 seconds, a time from when an event occurs until an operation is performed of 25 seconds, and regarding event results, results indicating a relationship with "the water level restored" are recorded. Then, for example, the correlation analysis unit 109 evaluates that there is no problem for a time of 1 second from when an event occurs until a conversation starts, and event results of "the water level restored." On the other hand, the correlation analysis unit 109 evaluates that a time from when a conversation starts until an operation starts is long based on the fact that a time from when a conversation starts until an operation is performed and a time from when an event occurs until an operation is performed are both 10 seconds, and an exemplary operation is delayed. In addition, the correlation analysis unit 109 may compare evaluation target conversation data with exemplary conversation data and analyze the reason for a prolonged time from when a conversation starts until an operation starts. For example, when a time from when a conversation starts until an instruction is issued is longer than that of exemplary conversation data, the correlation analysis unit 109 evaluates that "the time from when a conversation starts until an instruction is issued is long" and sets information indicating "shorten a time from when a conversation starts until an instruction is issued" for a duty manager as a suggested improvement plan. In addition, for example, when a time from when checking is performed (in the example in FIG. 2 "Yes, that's right") until an operation is performed is long, the correlation analysis unit 109 evaluates accordingly, and sets improvement plan information indicating "shorten a time from when checking is performed until an operation is performed" for an operator. For evaluation, for example, the correlation analysis unit 109 may analyze the stage of a series of exchanges that takes time based on the conversation pattern registered in the conversation analysis dictionary DB 104. In addition, for example, evaluation results may be registered according to patterns and improvement plan information may be predetermined for each pattern. For example, an improvement plan "shorten a time from when checking is performed until an operation is performed" is determined for an evaluation result pattern "the time from when a conversation starts until an instruction is issued is long."

For example, the correlation analysis unit 109 compares the number of times of speaking in evaluation target conversation data with the number of times of speaking in exemplary conversation data and determines whether there is a difference between them. For example, when the number of times of speaking in evaluation target conversation data is larger, it is evaluated that "the number of times of speaking is large" and improvement plan information indicating "Let's review content of the conversation" is set. For example, when the number of times of speaking in exemplary conversation data is large and the exemplary conversation data includes a conversation related to other parameters such as a temperature, a pressure, and a valve opening/closing condition before "low water level" is detected, the correlation analysis unit 109 detects a part of the conversation in which keywords not included in the evaluation target conversation data are included and a time period in which the conversation is performed based on keywords such as a "temperature" that is not found in specific words ("pump," "add," "start") extracted from evaluation target conversation data and words before and after ("pressurizer," "water level." "low"), and evaluates that the conversation is missing and sets improvement plan information to perform the conversation at an appropriate time. The correlation analysis unit 109 records the evaluation results and set improvement plan information in association with the analysis results in the analysis result DB 110.

The evaluation result output unit 111 outputs the evaluation result from the correlation analysis unit 109. Specifically, the evaluation result output unit 111 reads the conversation data, operation data, and plant data and their analysis results, evaluation results, and improvement plan information associated with a certain event recorded in the analysis result DB 110 and outputs them to a display device connected to the operation evaluation system. The output example of the evaluation result output unit 111 is shown in FIG. 5.

Figure 5:
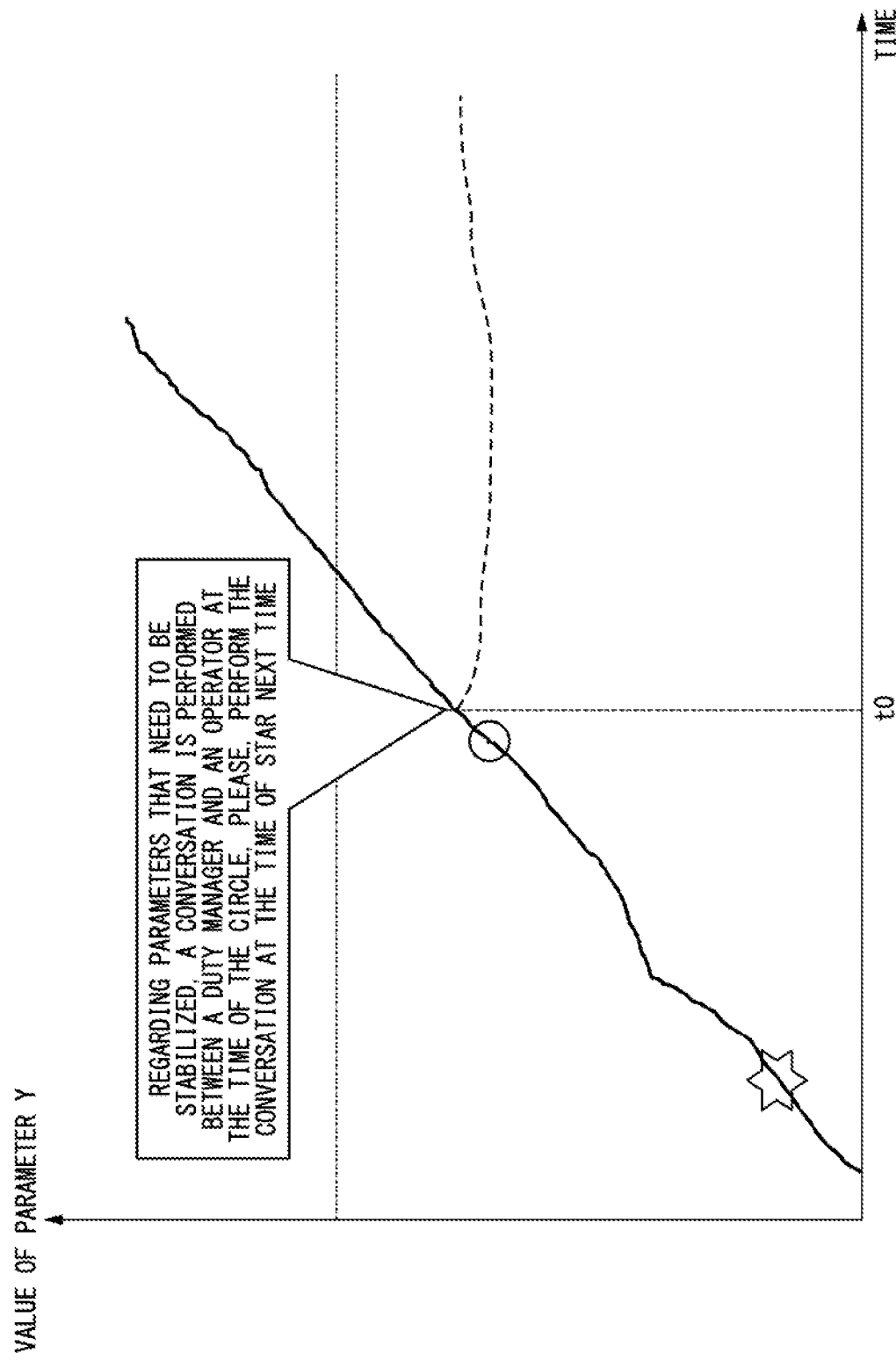
FIG. 5 is a diagram showing an example of an operation evaluation result in one embodiment of the present invention.

FIG. 5 is a diagram showing an example of an operation evaluation result in one embodiment of the present invention.

FIG. 5 is a graph showing a transition of a value of a parameter Y (for example, water level) for which a certain stability is required. FIG. 5 shows a graph of a result obtained when an operator performs a conversation and operation during certain operational training and a graph of the parameter Y when an exemplary conversation and operation are performed. Until the time t0, two graphs draw the same trajectory, and as a result of a predetermined operation performed before the time t0, two graphs draw different trajectories at the time t0 and later. The solid line graph indicates the result of an operation performed by an operator during training and the dotted line graph shows the result according to an exemplary operation. The circle indicates a time at which an operator during training started a conversation related to the event and the star indicates a time at which a conversation started in an exemplary operation. The graphs in FIG. 5 show a difference in results generated when, for example, a skilled operator reads a manual in advance and reads between the lines of the manual, checks and prepares the next operation early, and performs the operation, while an unskilled operator starts a conversation just before the operation. Even though early checking and preparations have been recommended in the past, it may be difficult to ascertain that checking and preparations need to be performed early. According to the output result of the evaluation result output unit 111, it is possible to quantitatively ascertain how early checking and the like should be performed.

In addition, as described above, the correlation analysis unit 109 compares conversation data and the like from an operator with exemplary conversation data and the like, and performs evaluation, and sets improvement plan information. In FIG. 5, the sentence "regarding parameters that need to be stabilized, a conversation is performed between a duty manager and an operator at the time of the circle, please, perform the conversation at the time of star next time" is improvement plan information set for the training recorded in the analysis result DB 110.

The evaluation result output unit 111 generates graphs exemplified in FIG. 5 based on conversation data, operation data, and plant data related to a certain training event recorded in the analysis result DB 110 and conversation data, operation data, and plant data related to the same training event and registered in the good training data DB 5. The evaluation result output unit 111 reads improvement plan information recorded in the analysis result DB 110, generates advice information for the next time as exemplified in FIG. 5, and outputs it to the display device. By reviewing the evaluation results, the operator and the duty manager can ascertain improvement points in the conversation when the same event is processed next time.

For example, a configuration in which, when the circle or the like in the graph is clicked, conversation data during training exemplified in FIG. 2 is displayed, and when the star or the like in the graph is clicked, exemplary conversation data is displayed may be used. In addition, together with improvement plan information, a determination result indicating whether a predetermined type of conversation is established may be displayed. For example, if 3-way communication is established, the evaluation result output unit 111 displays "conversation is possible in the type of 3-way communication" and if 3-way communication is incomplete, content of "Let's repeat and check" may be displayed and "the degree of establishment in the conversation is 60%" may be displayed.

Next, a flow of processes of an operation skill evaluation method according to the present embodiment will be described.

Figure 6:
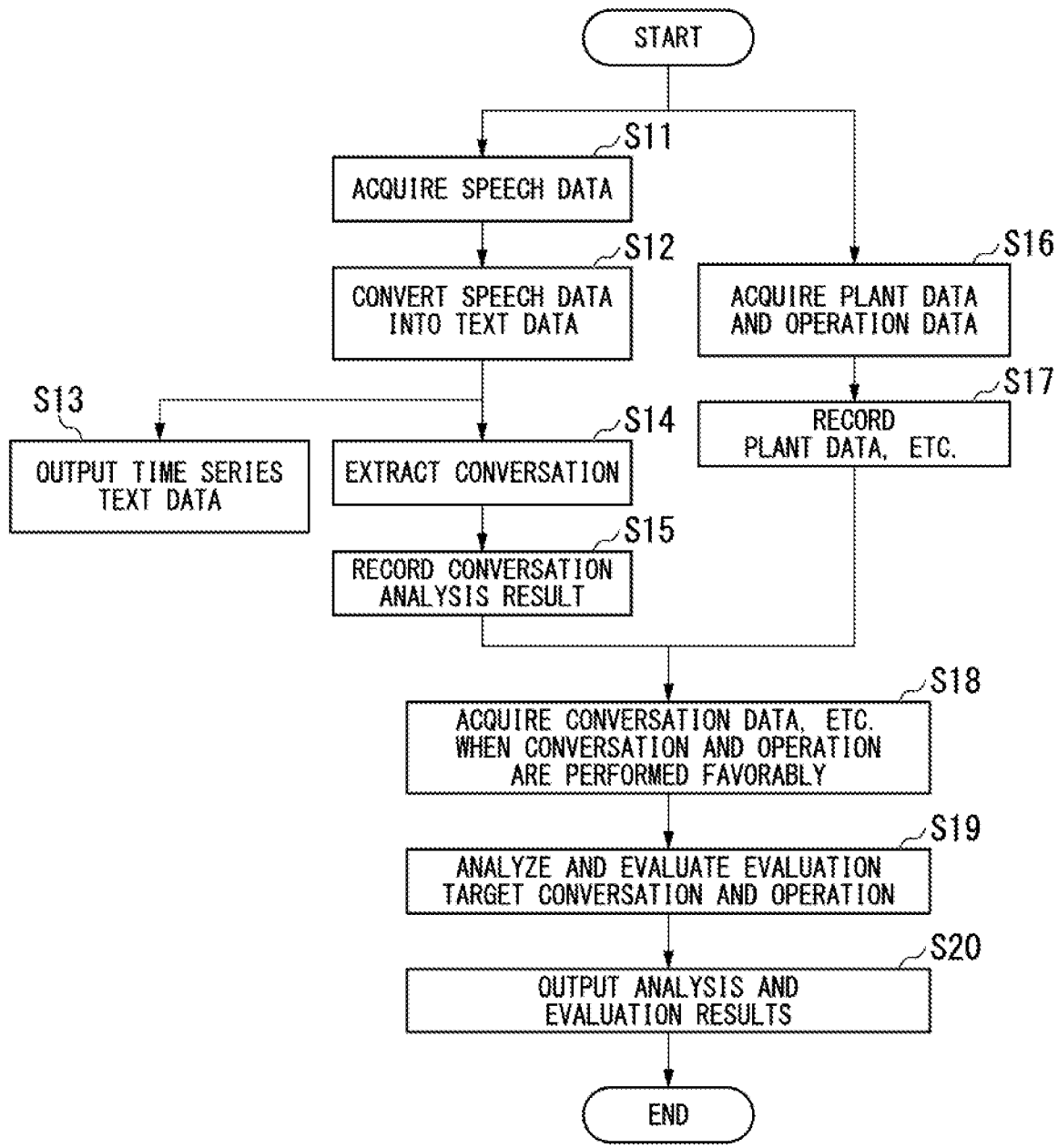
FIG. 6 is a flowchart showing an example of an operation evaluation method in one embodiment of the present invention.

FIG. 6 is a flowchart showing an example of an operation evaluation method according to an embodiment of the present invention.

First, the simulator device 3 simulates the plant status when an event occurs according to a certain training scenario. In a room in which operational training is performed, each member of an operation team composed of a duty manager and an operator participates a training in which a conversation and operation are performed to handle the event simulated by the simulator device 3 using a PC or the like. The microphones 2a and 2b collect a conversation during the training and output it to the operation evaluation system 10. In the operation evaluation system 10, the input unit 101 acquires speech data of the collected conversation (Step S11). The input unit 101 outputs the speech data to the speech recognition unit 102. The speech recognition unit 102 converts the speech data into text data using a speech recognition function (Step S12). In addition, the speech recognition unit 102 associates each speech included in text data with a time at which speech was performed and speaker identification information. The speech recognition unit 102 outputs text data to which time information and speaker identification information are added to the text data output unit 103 and the conversation extraction unit 105.

The text data output unit 103 outputs the text data to which time information and the like are added to the display device. The display device displays text data including time-series word exchange exemplified in FIG. 2.

The conversation extraction unit 105 extracts a bundle of conversations from the text data acquired from the speech recognition unit 102. In order to extract the conversation, conversation patterns registered in the conversation analysis dictionary DB 104 are referred to. For example, in the conversation analysis dictionary DB 104, based on 3-way communication, 2-way communication, and other predetermined conversation types for improving accuracy of transmission of information within the team, word exchange patterns are registered. The conversation extraction unit 105 searches text data for a part of word exchange according to the pattern and extracts a series of word exchanges that match the pattern (or close to the pattern) as conversation data (Step S14). In addition, the conversation extraction unit 105 extracts specific words, a conversation start time, the number of times of speaking, other words before and after, an event, and the like from the extracted conversation data based on keywords registered in the conversation analysis dictionary DB 104. The conversation extraction unit 105 records the extracted conversation data, specific words, and the like in the conversation extraction result DB 106 (Step S15).

In addition, the conversation extraction unit 105 determines, for example, whether 3-way communication is established based on the extracted conversation data, and records its determination result and the degree of establishment of the conversation in association with conversation data in the conversation extraction result DB 106.

On the other hand, the simulator device 3 stores operation data in which operations performed during training are recorded together with a time and plant data in which information indicating the plant status is recorded together with a time and outputs this data to the operation evaluation system 10. In the operation evaluation system 10, the input unit 101 acquires plant data and operation data (Step S16). The input unit 101 outputs the plant data and operation data to the operation/plant data recording unit 107. The operation/plant data recording unit 107 records this data in the operation/plant data DB 108 (Step S17).

Next, the correlation analysis unit 109 acquires conversation data, operation data, and plant data when the conversation and operation are performed favorably for the event that is a subject of evaluation target training from the good training data DB 5 (Step S18). The correlation analysis unit 109 analyzes correlations between conversation data recorded in the conversation extraction result DB 106 and operation data and plant data recorded in, the operation/plant data DB 108 as described in FIG. 4. The correlation analysis unit 109 compares correlations of the conversation, the operation and the like based on the analysis results with good conversation data and the like, evaluates the conversation and operation in the evaluation target training (Step S19), and sets improvement plan information. The correlation analysis unit 109 records analysis results, evaluation results, and the like in the analysis result DB 110.

Next, the evaluation result output unit 111 reads information recorded in the analysis result DB 110 and generates image data exemplified in FIG. 5 and outputs analysis and evaluation results and the like (Step S20).

Based on the evaluation results in Step S20, when conversation data and the like of the operator are not inferior to exemplary correlation data registered in the good training data DB 5 and include excellent content, a set of conversation data, operation data, and plant data of the operator of this time may be transferred to the operation evaluation result management device, and registered in the good training data DB 5 as new exemplary data.

Plant operational training is generally evaluated in consideration of compliance of operations, amounts of variations in parameters, and the like, and evaluation based on a correlation between the operation and the conversation is not performed. On the other hand, according to the present embodiment, it is possible to visualize the conversation of the operator performed during operational training by applying a speech recognition technique to an operational training simulator. In addition, it is possible to analyze and visualize the effect of the conversation performed during operational training on the plant operation (operations and operation results). Therefore, the effect of conversation in the plant operation, which has not been considered in the past, is recognized, a conversation time and transmission content in the conversation that enable a more accurate operation are examined, and it is possible to prevent erroneous operations, prevent human errors, and improve operation accuracy.

According to the present embodiment, when the conversation and operation of the operator are compared with an exemplary conversation and operation, for example, it is possible to ascertain how to improve the conversation time, conversation content, and the like. As exemplified in the evaluation results in FIG. 5, when the relationship between the exemplary conversation and operation is visualized, it is possible to share tacit skill knowledge of skilled operators and it is possible to improve skills of other operators and improve team performance.

Based on the analysis results and evaluation results according to the present embodiment, parameter check items, and conversation time and conversation content advices may be reflected in operation manuals, and a feedback in which a message prompting a conversation at an appropriate time is displayed on monitors in a central control room in which the operation of the plant is actually performed may be performed. Therefore, it is possible to improve operation accuracy.

Figure 7:
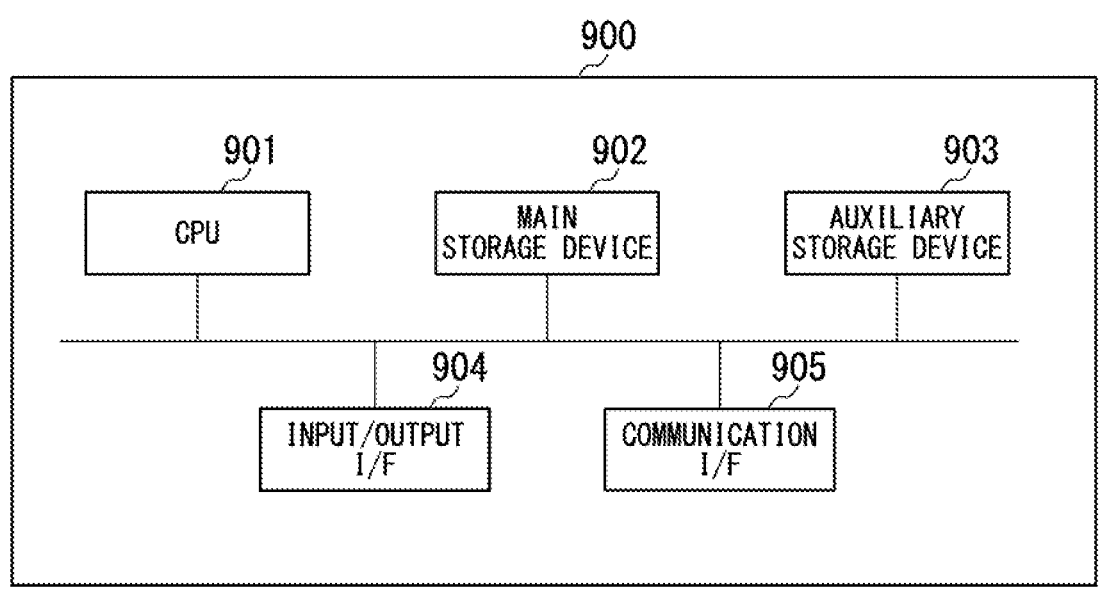
FIG. 7 is a diagram showing an example of a hardware configuration of an operation evaluation system in one embodiment of the present invention.

FIG. 7 is a diagram showing an example of a hardware configuration of an operation evaluation system in one embodiment of the present invention.

A computer 900 includes a CPU 901, a main storage device 902, an auxiliary storage device 903, an input/output interface 904, and a communication interface 905.

The above-described operation evaluation system 10 is mounted in the computer 900. Then, functions of the input unit 101, the speech recognition unit 102, the text data output unit 103, the conversation extraction unit 105, the operation/plant data recording unit 107, the correlation analysis unit 109, and the evaluation result output unit 111 described above are stored in the auxiliary storage device 903 in the form of a program. The CPU 901 reads the program from the auxiliary storage device 903, loads it in the main storage device 902, and executes the above process according to the program. The CPU 901 secures a storage area in the main storage device 902 according to the program. In addition, the CPU 901 secures a storage area in which data that is being processed is stored in the auxiliary storage device 903 according to the program. For example, the conversation analysis dictionary DB 104, the conversation extraction result DB 106, the operation/plant data DB 108, and the analysis result DB 110 may be stored in the auxiliary storage device 903.

A program for implementing all or some functions of the operation evaluation system 10 is recorded in a computer-readable recording medium, a computer system reads and executes the program recorded in the recording medium, and thus processes may be performed by functional units. The "computer system" here includes an OS and hardware such as a peripheral device. The "computer system" also includes a homepage provision environment (or a display environment) if a WWW system is used. The "computer-readable recording medium" refers to a portable medium such as a CD, a DVD, and a USB and a storage device such as a hard disk built into a computer system. When this program is distributed to the computer 900 via a communication line, the computer 900 that has received the distribution may load the program in the main storage device 902 and execute the process. In addition, the program may be a program for implementing some of the above-described functions or the above-described functions may be implemented in a combination with a program already recorded in the computer system.

The operation evaluation system 10 may include a plurality of computers 900. The conversation analysis dictionary DB 104, the conversation extraction result DB 106, the operation/plant data DB 108, and the analysis result DB 110 may be stored in an external storage device separate from the computer 900.

In addition, it is possible to appropriately replace components in the above embodiment with known components without departing from the scope and spirit of the present invention. In addition, the technical scope of the invention is not limited to the above embodiment and various modifications can be made without departing from the scope and spirit of the present invention.

For example, while an example in which conversation and operation data is collected in an operational training environment has been described in the above embodiment, an embodiment in which conversation data, operation data, and plant data generated in an actual plant operation environment are recorded and stored, and this data are input to the operation evaluation system 10 and evaluated later may be used. In addition, for example, some or all of functions of the operation evaluation system 10 may be incorporated into and mounted in the simulator device 3.

Facilities to which the operation evaluation system 10 is applied are not limited to those for operation of plants such as a nuclear power plant and a chemical plant, and the system can be also used in a place in which a task is performed while information transmission is performed among a plurality of members, for example, a production operation, a quality check operation, and a transportation operation such as product carry in/out in factories and the like.

The plant operational training is an example of a task, and the duty manager and the operator are examples of members. The input unit 101 is an example of a speech data acquisition unit and a task data acquisition unit. The operation data is an example of data indicating a task-related action, and the plant data is an example of data indicating the task status. The conversation extraction unit 105 is an example of the extraction unit, and the correlation analysis unit 109 is an example of the analysis unit.

INDUSTRIAL APPLICABILITY

According to the evaluation system, evaluation method, and program described above, it is possible to clarify the relationship between the operation and conversation of the operator in the plant and evaluate whether an appropriate conversation has been performed.

REFERENCE SIGNS LIST

1 Operational training system
2a, 2b Microphone
3 Simulator device
4 Operation evaluation result management device
5 Good training data DB 10 Operation evaluation system
101 Input unit
102 Speech recognition unit
103 Text data output unit
104 Conversation analysis dictionary DB
105 Conversation extraction unit
106 Conversation extraction result DB
107 Operation/plant data recording unit
108 Operation/plant data DB
109 Correlation analysis unit
110 Analysis result DB
111 Evaluation result output unit

The invention claimed is:

1. An evaluation system, comprising:
a speech data acquisition unit configured to acquire speech data from speech of a member engaged in a task;
a speech recognition unit configured to recognize content of the speech from the speech data and convert the content into text data;
a task data acquisition unit configured to acquire data indicating an action related to the task of the member and data indicating a task status;
an extraction unit configured to extract conversation data related to the task from the text data based on the content of the speech recognized by the speech recognition unit; and
an analysis unit configured to analyze correlations between the conversation data extracted by the extraction unit, the data indicating the action, and the data indicating the task status.

2. The evaluation system according to claim 1, wherein the analysis unit evaluates correlations between the analyzed conversation data, the data indicating the action, and the data indicating the task status based on data indicating a strong correlation between the conversation, the action, and the task status.

3. The evaluation system according to claim 1, further comprising
an evaluation result output unit configured to output information indicating a relationship between times at which conversations related to the task have been performed and results of the task for the evaluation result from the analysis unit.

4. The evaluation system according to claim 3, wherein the evaluation result output unit displays a graph of times at which the member has performed conversations along with the results of the task, and a graph of times at which exemplary conversations are performed along with the results of the task.

5. The evaluation system according to claim 3, wherein the analysis unit sets improvement plan information based on the evaluation result, and
wherein the evaluation result output unit outputs the improvement plan information.

6. The evaluation system according to claim 1, wherein the analysis unit analyzes temporal relationships between times at which conversations related to a task have been performed and times at which actions have been performed and relationships between times at which conversations related to the task have been performed and results of the task.

7. The evaluation system according to claim 1, wherein the analysis unit analyzes temporal relationships between times at which conversations related to the task have been performed and times at which the actions have been performed, and sets improvement plan information which requests to shorten a time until the action if a time from when checking of the member is performed in the conversation until the action is started is longer than a predetermined time.

8. The evaluation system according to claim 1, wherein the analysis unit analyzes temporal relationships between times at which conversations related to the task have been performed and times at which the actions have been performed, and sets improvement plan information which requests to shorten a time until an instruction of the action to the member if a time from when the conversation starts until the instruction is issued is longer than a predetermined time.

9. The evaluation system according to claim 1, wherein the analysis unit compares a first number of times of speaking which is the number of times of speaking in the conversation data with a second number of times of speaking which is the number of times of speaking in exemplary conversations, detects keywords which are included in the exemplary conversations but not included in the conversation when the second number of times of speaking is larger than the first number of times of speaking, sets improvement plan information which requests to perform the conversation regarding the keywords.

10. The evaluation system according to claim 1, wherein the analysis unit records the conversation data, the data indicating the action, and the data indicating the task status in the same time period to a database in association with each other.

11. The evaluation system according to claim 1, wherein the analysis unit analyzes whether content of the conversation data and the action have the right relationship.

12. The evaluation system according to claim 1, wherein the extraction unit determines whether a predetermined type of conversation is established for the conversation data.

13. The evaluation system according to claim 1, further comprising
a text data output unit configured to output content of the speech recognized by the speech recognition unit together with identification information of the member who made the speech and information about a time at which the speech was performed.

14. The evaluation system according to claim 1, wherein the evaluation system is a system for evaluating plant operation skills,
wherein the speech data acquisition unit acquires speech data of conversations that have been performed during operations by a plurality of members who have performed operations in the plant,
wherein the task data acquisition unit acquires information about operations performed by the members during operation of the plant and information indicating a plant status during the operation, and
wherein the analysis unit analyzes correlations between the conversations and the operations related to an event which was handled in the operation of the plant and the plant status.

15. An evaluation method, comprising:
a step of acquiring speech data from speech of a member engaged in a task;
a step of recognizing content of the speech from the speech data and converting the content into text data;
a step of acquiring data indicating an action related to the task of the member and data indicating a task status;

a step of extracting conversation data related to the task from the text data based on the recognized content of the speech; and a step of analyzing correlations between the extracted conversation data, the data indicating the action, and the data indicating the task status.

16. A non-transitory computer readable recording medium storing a program causing a computer of an evaluation system to perform:

a function of acquiring speech data from speech of a member engaged in a task;

a function of recognizing content of the speech from the speech data and converting the content into text data;

a function of acquiring data indicating an action related to the task of the member and data indicating a task status;

a function of extracting conversation data related to the task from the text data based on the recognized content of the speech; and a function of analyzing correlations between the extracted conversation data, the data indicating the action, and the data indicating the task status.

\* \* \* \* \*